United States Patent [19]

Lavallee

[11] Patent Number: 4,775,726

[45] Date of Patent: Oct. 4, 1988

[54] METHOD FOR EQUILIBRATING POLYAMIDE MAGNET WIRE COATINGS AND ENAMEL COMPOSITIONS

[75] Inventor: Francois A. Lavallee, Fort Wayne, Ind.

[73] Assignee: Essex Group, Inc., Fort Wayne, Ind.

[21] Appl. No.: 106,695

[22] Filed: Oct. 8, 1987

Related U.S. Application Data

[62] Division of Ser. No. 945,159, Dec. 22, 1986, Pat. No. 4,716,190.

[51] Int. Cl.$^4$ .................. B32B 15/00; B05D 5/12; C08F 283/04; C08G 69/48
[52] U.S. Cl. .................. 525/420; 174/110 N; 428/379; 427/117
[58] Field of Search .............. 525/419, 424, 437, 420; 524/386, 606

[56] References Cited

U.S. PATENT DOCUMENTS

| 4,031,287 | 6/1977 | Suzuki et al. | 428/379 |
| 4,098,627 | 7/1978 | Tompa et al. | 149/92 X |
| 4,448,936 | 5/1984 | Wang et al. | 525/424 |
| 4,550,055 | 10/1985 | Lavallee | 428/383 |
| 4,551,398 | 11/1985 | Lavallee | 428/383 |
| 4,568,607 | 2/1986 | Lavallee | 428/383 |
| 4,588,784 | 5/1986 | Lavallee | 525/419 |
| 4,599,387 | 7/1986 | Lavallee | 525/419 |
| 4,600,789 | 7/1986 | Sugerman et al. | 523/200 X |
| 4,631,201 | 12/1986 | Lavallee | 427/118 |
| 4,657,988 | 4/1987 | Sugerman et al. | 525/437 |
| 4,670,508 | 6/1987 | Ohdaira et al. | 525/64 |

Primary Examiner—Lorraine T. Kendell

[57] ABSTRACT

A magnet wire enamel based on polyamide resins is disclosed in which the molecular weight of the polyamide resin is reduced through an equilibration reaction with a solvolytic agent and a titanate catalyst. Also disclosed is a method of applying said enamel to a magnet wire substrate and the resulting enameled magnet wire.

3 Claims, No Drawings

METHOD FOR EQUILIBRATING POLYAMIDE MAGNET WIRE COATINGS AND ENAMEL COMPOSITIONS

CROSS REFERENCE TO RELATED APPLICATIONS

This is a division of application Ser. No. 945,159 filed on Dec. 22, 1986, now U.S. Pat. No. 4,716,190.

This application relates to commonly assigned, U.S. patent application Ser. No. 945,160 now U.S. Pat. No. 4,725,458, for URETHANE MODIFIED NYLON MAGNET WIRE ENAMEL by J. J. Harber filed on even date herewith.

TECHNICAL FIELD

The field of art to which this invention pertains is the equilibration of polyamide resins and in particular the preparation of polyamide for use in magnet wire coatings.

BACKGROUND ART

Nylon and other conventional polyamide resins are used throughout the magnet wire industry for the purpose of insulating the wire, either as a solecoat construction (the only insulating layer) or a topcoat applied over a basecoat enamel, e.g. polyester, polyurethane, etc. In using such polyamide resins in this way, a number of problems arise during their application. In particular, it is noted that the available polyamide resins have very high molecular weights, typically ranging from about 18,000 to about 40,000 molecular weight units (weight average). These high molecular weight materials mean that a resulting solution of this material at a high solids content (greater than 17 percent by weight of solids) can have a viscosity at room temperature (about 77° F.) of about 4,000 centipoises to about 11,000 centipoises. Since the typical enamel or coating which may be easily applied to magnet wire has a viscosity of about 50 centipoises to about 2000 centipoises at application temperature greater than 100° F. (37.8° C.). The ability to prepare an acceptable high solids enamel using this nylon is not practical. These polyamide solutions are often prepared having very low solids contents of about 5 percent to about 16 percent by weight of solids. This lowers the viscosity to a level which is within the working range of the magnet wire enamel applicators.

Unfortunately, this reduction in solids content means that more diluent must be used resulting in an added cost to production and an increase in environmental pollutants. In addition, the lower solids content can mean more passes for the wire through the coating are required to apply the desired coating thickness onto the wire, again adding cost to the wire production.

It is known that the molecular weight and thereby the viscosity of the polyamide resin coatings may be reduced by equilibrating the resin. Equilibration, as used in this application, refers to the solvolytic molecular weight reduction of a polymer. A common equilibration process which is used requires the reaction of monoethanolamine with the polyamide resin as shown in reaction 1 below:

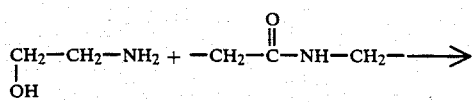

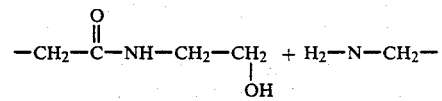

This reaction requires that an excess of monoethanolamine be present during the reaction. The excess must be neutralized prior to the coating being applied to the wire and is accomplished by adding acetic anhydride to the solution which reacts with the monoethhanolamine in the primary reaction as shown in reaction 2 below:

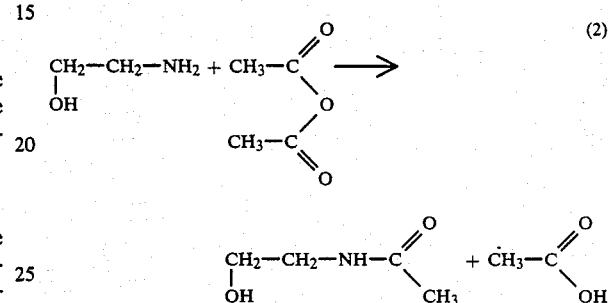

However certain additional side reactions also occur during this neutralization process, the most important of which is shown below in reaction 3.

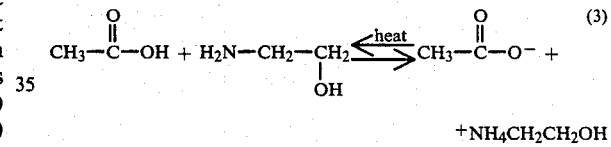

This reaction being reversible at relatively low temperatures (about 80° C. to about 100° C.) means that during the oven curing of the coating (which temperatures exceed those to reverse the reaction) acetic acid and monoethanolamine are produced. The acetic acid is easily volatilized out of the coating during curing but the ethanolamine is not completely removed and remains behind. This material is known to be deleterious to many wire varnish curing mechanisms. Therefore, the use of this nylon as a wire coating (particularly for fine wire) results in wire having undercured coatings which do not effectively adhere to the wire or to wire whose mechanical and electrical properties are prematurely reduced during use.

In addition, the resulting wire coatings do not exhibit uniform properties from batch to batch and quality control is difficult. One evidence of this is the fluctuation in the mandrel pull test used to test the ability of wire coating to withstand numerous cycles of bending about a mandrel without exhibiting cracks or defects in the wire coating. Coatings formed using the conventional monoethanolamine approach to preparing the equilibrated polyamide exhibits wide fluctuations in its ability to pass such tests and in many instances the wire is unacceptable.

Therefore, what is needed in the art is a method by which the polyamide resin may be equilibrated without the introduction or resulting byproducts which will affect the quality of the final coated wire product.

DISCLOSURE OF INVENTION

Disclosed is a method for equilibrating a polyamide resin by reacting at elevated temperatures, a polyamide with a solvolytic agent in the presence of a titanium catalyst to reduce the average molecular weight of the polyamide resin and therefore, its viscosity.

Also disclosed is a magnet wire substrate having at least one layer of electrically insulating enamel which is the reaction product of a polyamide resin, a solvolytic agent and a titanium catalyst.

Also disclosed is a wire enamel composition comprising the reaction product of a polyamide resin, a titanate cast catalyst and a solvolytic agent.

Also disclosed is a method of making magnet wire having at least one layer of electrically insulating enamel which is a reaction product of a polyamide resin, a titanate catalyst and a solvolytic agent.

Other features and advantages of the present invention will become more apparent from the following detailed description of the preferred embodiment.

BEST MODE FOR CARRYING OUT THE INVENTION

A solution of the polyamide resin is prepared in the conventional manner by dissolving the resin in a suitable organic solvent or mixture of organic solvents. These solvents are generally conventional hydroxyl containing aromatic hydrocarbons and some typical ones are cresylic acid, phenol, hydrocarbon etc. The preferred solvent is a mixture of cresylic acid and phenol, typically in concentrations of about 25 percent by weight cresylic acid to about 75 percent by weight phenol. It is preferred that for an enamel which is to be stored or is desired to have a stable shelf life, that the solvent contain greater than 60 percent by weight of phenol.

The polyamide resin may be any polyamide resin useful as magnet wire coatings. These are usually conventional nylon resins such as nylon 6; nylon 6,6; nylon 11; nylon 12 and aliphatic aromatic nylons such as Trogamide ® Nylon (Dynamit-Nobel). The preferred nylon is nylon 6,6 because of its high melt point. These nylons are commercially available and will have molecular weights (weight average) ranging above 25,000 and ususally between 25,000 to 40,000 and preferably between 25,000 to 35,000. The dissolution of the resin in a solvent is performed using conventional techniques and equipment. Although almost any concentration of resin in the solution may be possible to practice this invention, it is most practical to formulate the solution having a resin solids concentration from about 10 percent to about 30 percent by weight with about 20 percent to about 30 percent by weight being preferred.

Once the polyamide resin has been dissolved, the solvolytic agents may be introduced. These agents will be compounds particularly organic acids having at least one active hydrogen which may react with the polyamide resin during the equilibration. The preferred agents are the aliphatic alcohols such as ethylene glycol, however, other materials which may be used are adipic acid, hexamethylene diamine and other polyalcohols or even water or the actual hydrogen terminated polyamides. The solvolytic agent is generally added in amounts ranging from about 0.5 percent to about 15 percent by weight of the polyamide resin. It should be noted that the more solvolytic agent added relative to the polyamide resin, the lower the molecular weight and therefore the viscosity will be of the resulting equilibrated resin at reasonable rates. The preferred range is between about 0.5 percent to about 5 percent by weight of the solvolytic agent to polyamide resin.

To this solution is then added an organic titanate catalyst such as a chelate, alkyl or aromatic titanate. These titanates may be any of the organic titanates, such as those sold by DuPont Corporation under the trademark Tyzo ® titanates or others. These titanates can be tetra-alkyl titanates having the formula $$Ti(OR)_4$$

where R is an alkyl group typically containing at least three carbon atoms. Examples of titanates such as these are tetra-isopropyl titanate, tetra-N-butyl titanate or tetrakis (2-ethyl hexyl) titanate. Other useful titanates can also be aromatic titanates having the formula $$Ti(OR)_4$$

where R is an aromatic group and including polymeric titanates (typically dimers and trimers). Titanates of this variety are cresylic (or phenolic) titanates or their derivatives such as tetra-alkyl (e.g. ethyl, propyl etc.) phenolic, xylenolic, halogenerated phenolic, etc. The dimers and trimers will typically be linear (but may be branched) and chain extended through the —TiO— group e.g.

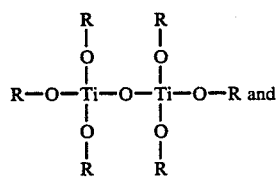

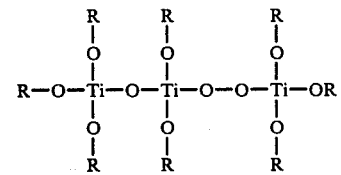

However the preferred materials are the titanate chelates such as acetylacetonate tianate, ethyl acetonate titanate, etc. These materials will have a structure

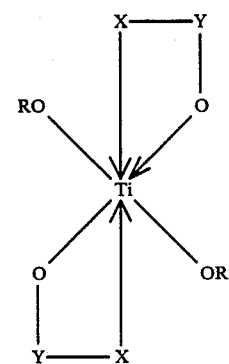

in which X represents a functional group consisting oxygen or nitrogen and Y represents a two or three carbon chain, and R is an alkyl group typically containing at least three carbon atoms. The most preferred titanate is the acetylacetonate titanates having the structure

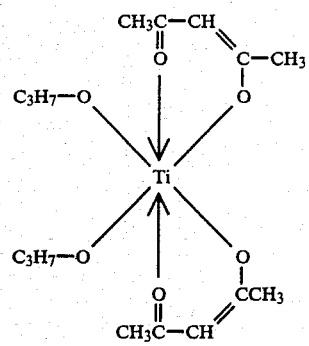

In addition to these individual titanates, mixtures of these titanates may also be used.

The titanate catalyst is added to the solution in concentrations of about 0.5 percent to about 5 percent by weight based on the weight of the resin present in the solution. The preferred concentration is about 1 percent to about 2 percent by weight of the polymer resin. All of the reagents should be mixed to a homogenous solution using conventional mixing or stirring apparatus. The solution is then heated to above its reaction temperature which is typically above 100° C. and more typically in excess of 140° C. with the preferred range being about 140° C. to about 160° C. The lower limit will be determined by the speed at which the reaction takes place (e.g. the lower the temperature the slower the reaction) while the upper temperature limit will be a function of the thermal stability of the reactants.

Although not wishing to be bound by any particular theory, it is believed that the hydrolysis takes place as a trans amide esterfication which takes place as shown below in reaction 4.

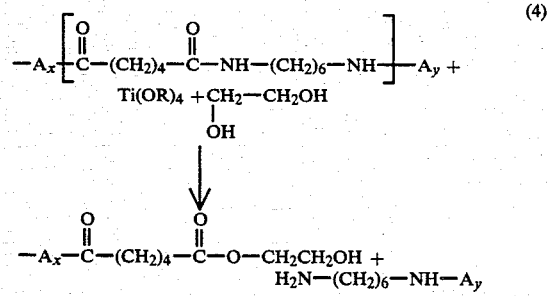

(4)

wherein x+y=10 to 200 and

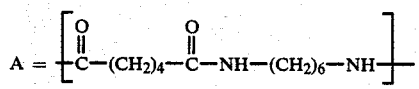

The reaction effectively cleaves the larger molecules of the resin in half thereby reducing the molecular weight in half as well. This results in a resin with significantly lower viscosities at the same solids content. It has been discovered that the use of the titanates are a critical feature of the equilibration process using these solvolytic agents. It appears that the titanates act as catalysts to advance the reaction at a speed which makes the reaction practical in a production environment. It has been noted that the reaction remains at a virtual standstill irregardless of the temperature until the introduction of the titanates. Once the titanate is added, the reaction advances at a reasonable pace. It has also been noted that the more titanate which is added to the reactants, the faster the reaction advances.

In determining how far to allow the equilibration process to advance samples are taken from the reaction vessel periodically. These samples are then diluted to the predetermined final solids content by a solvent mixture of phenol and cresylic acid (other compatible mixtures may be used if desired), and a viscosity measurement is made on the material. When the reaction material reaches the predetermined viscosity at a given temperature, the reaction is cooled. The solids content and viscosity of the desired final product will, of course, be a function of the enameling requirements of a given user and must be determined for each application. Often, these enameling requirements are closely related to viscosity and therefore the enamels are further diluted using compatible solvents, typically phenol or cresylic acid mixtures, to produce an enamel with a viscosity of about 1,000 centipoise to 45,000 centipoise at 86° F. (30° C.) or higher depending on the applicator, with the preferred range being about 2,000 centipoise to about 3,500 centipoise at 86° F. (30° C.) and having solids contents between 10 percent to 30 percent by weight with the preferred being about 20 percent to about 22 percent by weight.

EXAMPLE

To a kettle of the appropriate size (100 gallons) was added 312.4 pounds of a solvent mixture comprised of 25 percent by weight of cresylic acid and 75 percent by weight of phenol. An agitator was turned on and 1.6 pounds of tetra acetyl acetonate titanate chelate, 5.3 pounds of ethylene gylcol and 105.6 pounds of reprocessed nylon 6,6 scrap fiber, having an average molecular weight (weight average) of 35,000 were added to the solvent. The kettle was then purged with nitrogen gas at a rate of 10 standard cubic feet per minute (SCFM) for 15 minutes and then reduced to 1 SCFM. The contents were then heated, using steam, to a temperature of 150° C.-155° C. Agitation and nitrogen purging were continued during the entire equilibration process. After the solution had been at temperature for 5 hours, samples were removed every two hours and tested for viscosity until such time as the viscostty reached the previously determined set point of 160 centipoise at 86° F. (30° C.). Additionally, the solids content of the solution was determined from every other sample taken.

Once the required viscosity was achieved, the resulting enamel was then diluted using a mixture of 31 percent by weight of xylene, 15 percent by weight of 150 Hydrocarbon ® (Shell Chemical Corporation) and 54 percent by weight of a mixture of phenol and cresylic acid in which the phenol represents 75 percent by weight. This formed the final enamel which had a solids content of 21.6 percent by weight and a viscosity of 2,900 centipoise at 86° F. (30° C.).

This enamel coating may be applied to magnet wire using conventional wire enameling techniques and will produce a coating which meets all of the industry standards for such enamels. Such processes typically draw the magnet wire substrate through a die applicator which applies a thin film of the enamel to the wire in a uniform manner. The coated wire is then passed through a curing process, typically an oven, which evaporates the solvents and cures the enamel forming the insulating layer. The wire may then be passed through the applicator again in which further layers of enamel may be applied until the desired thickness of the insulating layers has been achieved.

This method for equilibrating polyamide materials offers a number of important advantages over other prior art techniques. First, the process contains no corrosive, noxious chemical or by-products which could cause problems with the mixing containers or other metal machinery through corrosion. Secondly, the reaction and processing is substantially simpler as all of the reagents remain in the final product and no further processing is required to remove undesirable side products which may impair the effectiveness of the enamel. This single batch method therefore saves time and money in preparation. Thirdly, this method allows for the preparation of a high solids nylon magnet enamel having viscosities which allow for easy and uniform application to the wire substrate using conventional application processes.

It should be understood that the invention is not limited to the particular embodiments shown and described herein, but that various changes and modifications may be made without departing from the spirit and scope of this novel concept as defined by the following claims.

I claim:

1. A magnet wire enamel comprisnig the reaction product of a polyamide resin, about 0.5 to about 5 percent by weight of said resin of an organic titanate catalyst selected from the group consisting of $(RO_4)$ Ti, dimers, trimers and mixtures thereof where R is an alkyl group or an aromatic group, and a solvolytic agent comprising an active hydrogen containing compound capable of cleaving the larger molecules of said polyamide resin.

2. The enamel of claim 1 wherein the polyamide resin is present in about 10 percent to about 30 percent by weight based on the solids content of the enamel.

3. The enamel of claim 1 wherein the solvolytic agent is ethylene glycol.

* * * * *